(12) United States Patent
Cheng et al.

(10) Patent No.: US 12,722,677 B2
(45) Date of Patent: Sep. 1, 2026

(54) FOLDING FRAME AND WAGON USING THE SAME

(71) Applicants: Rui Cheng, Tianjin (CN); Xuefeng Zheng, Hangzhou (CN)

(72) Inventors: Rui Cheng, Tianjin (CN); Xuefeng Zheng, Hangzhou (CN)

(73) Assignees: Rui Cheng, Tianjin (CN); Xuefeng ZHeng, Hangzhou (CN)

( * ) Notice: Subject to any disclaimer, the term of this patent is extended or adjusted under 35 U.S.C. 154(b) by 310 days.

(21) Appl. No.: 18/426,276

(22) Filed: Jan. 29, 2024

(65) Prior Publication Data

US 2025/0242848 A1 Jul. 31, 2025

(51) Int. Cl.
*B62B 5/06* (2006.01)
*B62B 3/00* (2006.01)
*B62B 3/02* (2006.01)

(52) U.S. Cl.
CPC .............. *B62B 3/007* (2013.01); *B62B 3/025* (2013.01); *B62B 5/065* (2013.01); *B62B 2205/06* (2013.01)

(58) Field of Classification Search
CPC ................................ B62B 3/007; B62B 3/025
See application file for complete search history.

(56) References Cited

U.S. PATENT DOCUMENTS

| | | | | |
|---|---|---|---|---|
| 9,738,298 | B1 * | 8/2017 | Yang | B62B 3/025 |
| 2024/0300560 | A1 * | 9/2024 | Zhang | B62B 3/007 |
| 2024/0343285 | A1 * | 10/2024 | Yang | B62B 5/067 |
| 2025/0018989 | A1 * | 1/2025 | Zhang | B62B 3/002 |
| 2025/0171065 | A1 * | 5/2025 | Chen | B62B 5/067 |
| 2025/0222968 | A1 * | 7/2025 | Wu | B62B 3/007 |

FOREIGN PATENT DOCUMENTS

| | | | | |
|---|---|---|---|---|
| CN | 115817605 A | * | 3/2023 | |
| CN | 117087730 A | * | 11/2023 | B62B 3/02 |

* cited by examiner

*Primary Examiner* — Steve Clemmons
(74) *Attorney, Agent, or Firm* — Jose Cherson Weissbrot

(57) ABSTRACT

The folding frame includes a first stand assembly arranged along a length direction, a second stand assembly arranged along a width direction, and a bottom frame assembly. The stand assemblies include cross-arranged telescopic rods and connecting members that enable folding and unfolding of the frame. The bottom frame assembly includes multiple connecting rods arranged in an X-shaped configuration to provide enhanced support and stability. The bottom frame assembly is detachably connected to the stand assemblies through connectors and pull rods. During use, the frame is unfolded and supports a box body for carrying goods, while during storage, the frame is collapsed without increasing overall height or package size. The structure improves compactness, stability, and ease of transportation and storage.

20 Claims, 16 Drawing Sheets

FOLDING FRAME AND WAGON USING THE SAME

TECHNICAL FIELD

The present invention relates to the technical field of wagons, in particular to a folding frame and a wagon using the same.

BACKGROUND

In daily life and production, it is frequently necessary to carry luggage or objects, and wagons are frequently used in the process of carrying. However, at present, the packaging size of some folding wagons in the market is larger after folding, resulting in higher transportation cost and storage cost, which makes people need to occupy more space when they go out for transportation or storage, and also leads to a much higher transportation cost when the products are transported overseas, which leads consumers to spend more to use the products, thus making the products lose competitiveness.

China Patent No. 201610742284 discloses a wagon that can be switched between a folded state and an unfolded state. It is provided with a vertical telescopic rod assembly, and each connecting rod moves upward during folding. However, this arrangement will lead to a large package size, which is not conducive to transportation and inconvenient for people to carry out.

China patent with the application number of 201920689637 discloses a pull rod and a folding cart. By flexibly connecting the pull rod with the car body, the structural space of the pull rod is more compact, and the utilization rate is higher, which saves the occupied space of the folding wagon and the pull rod after folding, and can conveniently adjust the length of the pull rod, which is more stable and not easy to break. However, the folding bottom frame of the folding wagon is a single-layer structure, and the supporting strength at the bottom is not enough, the supporting gap is large, and the stability is not high.

Based on the above problems, a brand-new wagon is needed, which will not cause the frame to rise or the package size to increase after folding and will not make people occupy more space when they go out for transportation or storage. At the same time, the wagon should have good stability, so as to meet the use needs of different users.

SUMMARY

The present invention pertains to a folding frame, wherein the folding frame comprises a first stand assembly, a second stand assembly and a bottom frame assembly; and wherein, the first stand is arranged along a length direction of the folding frame, and comprises two groups of first telescopic assemblies and a group of first connecting assemblies, wherein any one of the two groups of first telescopic assemblies comprises a first connecting rod and a first telescopic rod, and the first connecting rod and the first telescopic rod are distributed in a cross shape; and the first connecting assembly consists of two first connecting rockers, and wherein, the second stand assembly is arranged along a width direction of the folding frame, and comprises two groups of second telescopic assemblies, wherein any one of the two groups of second telescopic assemblies comprises a second connecting rod and a second telescopic rod, and the second connecting rod and the second telescopic rod are distributed in a cross shape; and wherein, the bottom frame assembly comprises two groups of third connecting assemblies, each group of third connecting assemblies consists of at least four third connecting rods and a third connector, and at least four of the third connecting rods are distributed in an X shape as a whole; and wherein, a first connector and a second connector are respectively arranged at joints of the first stand assembly and the second stand assembly; and the bottom frame assembly is detachably connected to the first stand assembly and the second stand assembly through the second connector; the bottom frame assembly is detachably connected with the first stand assembly through at least two pull rods, and the bottom ends of the pull rods are respectively hinged with one of the third connecting rods in the two groups of third connecting assemblies; and the top ends of the pull rods are respectively hinged with the first connecting assembly.

The present invention further provides a folding wagon, wherein the wagon comprises a folding frame and a box body; and the folding frame comprises a first stand assembly, a second stand assembly and a bottom frame assembly; and the first stand is arranged along a length direction of the folding frame, and comprises two groups of first telescopic assemblies and a group of first connecting assemblies, wherein any one of the two groups of first telescopic assemblies comprises a first connecting rod and a first telescopic rod, and the first connecting rod and the first telescopic rod are distributed in a cross shape; and the first connecting assembly consists of two first connecting rockers; and wherein, the second stand assembly is arranged along a width direction of the folding frame, and comprises two groups of second telescopic assemblies, wherein any one of the two groups of second telescopic assemblies comprises a second connecting rod and a second telescopic rod, and the second connecting rod and the second telescopic rod are distributed in a cross shape; and wherein, the bottom frame assembly comprises two groups of third connecting assemblies, each group of third connecting assemblies consists of at least four third connecting rods and a third connector, and at least four of the third connecting rods are distributed in an X shape as a whole; and wherein, a first connector and a second connector are respectively arranged at joints of the first stand assembly and the second stand assembly; and the bottom frame assembly is detachably connected to the first stand assembly and the second stand assembly through the second connector; the bottom frame assembly is detachably connected with the first stand assembly through at least two pull rods, and the bottom ends of the pull rods are respectively hinged with one of the third connecting rods in the two groups of third connecting assemblies; and the top ends of the pull rods are respectively hinged with the first connecting assembly;

and the box body has a rectangular structure and is detachably fixed inside the folding frame.

The present invention further provides a method for carrying goods, which comprises providing a folding wagon, wherein the folding wagon comprises a folding frame and a box body; and the folding frame comprises a first stand assembly, a second stand assembly and a bottom frame assembly;

and the first stand is arranged along a length direction of the folding frame, and comprises two groups of first telescopic assemblies and a group of first connecting assemblies, wherein any one of the two groups of first telescopic assemblies comprises a first connecting rod and a first telescopic rod, and the first connecting rod and the first telescopic rod are distributed in a cross shape; and the first connecting assembly consists of two first connecting rockers; and wherein, the second stand assembly is arranged along a width direction of the folding frame, and comprises two groups of second telescopic assemblies, wherein any one of the two groups of second telescopic assemblies comprises a second connecting rod and a second telescopic rod, and the second connecting rod and the second telescopic rod are distributed in a cross shape; and wherein, the bottom frame assembly comprises two groups of third connecting assemblies, each group of third connecting assemblies consists of at least four third connecting rods and a third connector, and at least four of the third connecting rods are distributed in an X shape as a whole; and wherein, a first connector and a second connector are respectively arranged at joints of the first stand assembly and the second stand assembly; and the bottom frame assembly is detachably connected to the first stand assembly and the second stand assembly through the second connector; the bottom frame assembly is detachably connected with the first stand assembly through at least two pull rods, and the bottom ends of the pull rods are respectively hinged with one of the third connecting rods in the two groups of third connecting assemblies; and the top ends of the pull rods are respectively hinged with the first connecting assembly; and the box body has a rectangular structure and is detachably fixed inside the folding frame; and the method comprises:

when in use, unfolding the first stand assembly and the second stand assembly; and fixing the bottom frame assembly under the first stand assembly and the second stand assembly; and placing the box body above the bottom frame assembly; and when in storage, taking down the box body; and gathering the folding frame for storage.

The terms “invention.” “the invention,” “this invention” and “the present invention” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
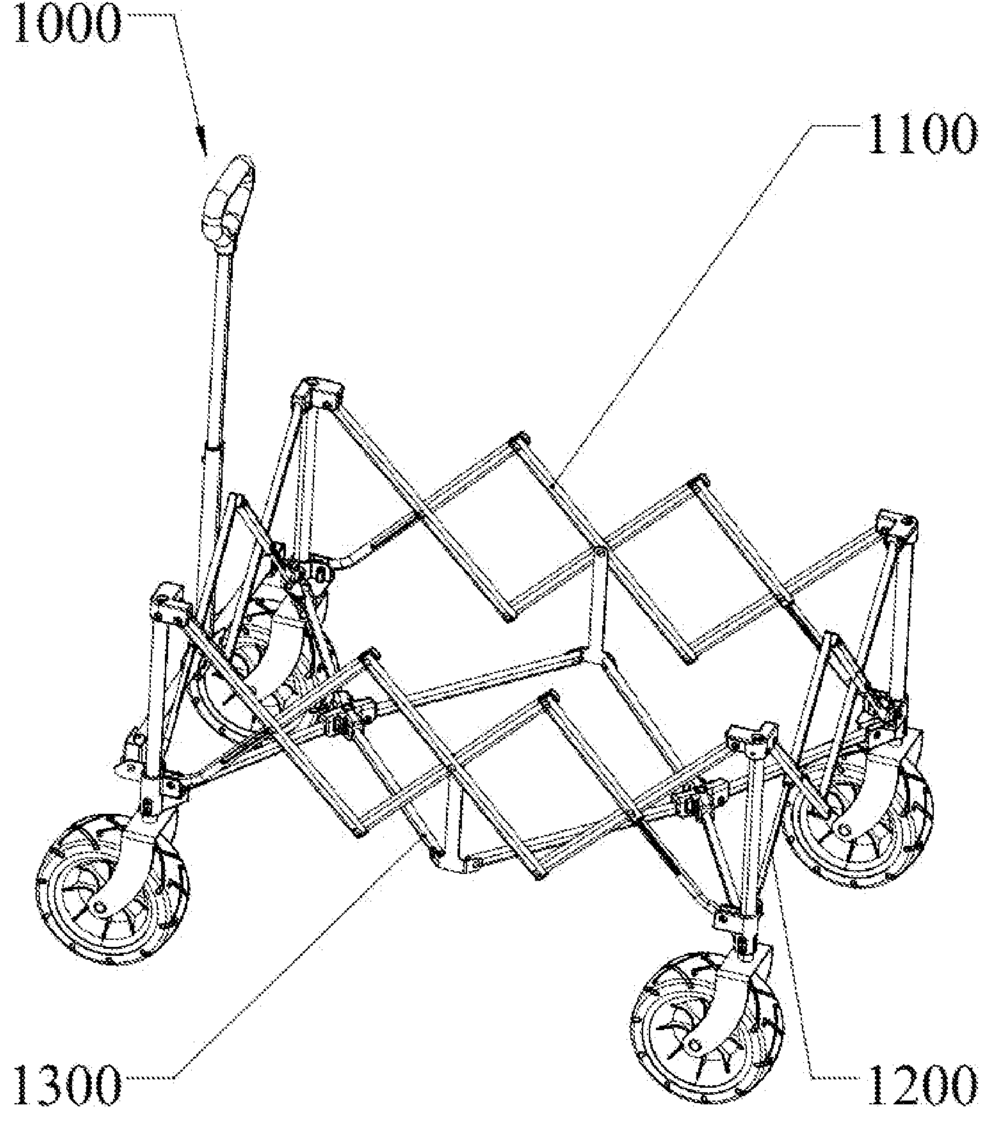
FIG. 1 is a schematic diagram of a folding frame in the application of the present invention.

Folding frame (1000); First stand assembly (1100); First telescopic assembly (1110); First connecting rod (1120); First telescopic rod (1130); First connecting assembly (1140); First connecting rocker (1150); Second stand assembly (1200); Second telescopic assembly (1210); Second connecting rod (1220); Second telescopic rod (1230); Sliding rod (1240); Sliding groove (1241); Arc-shaped structure (1242); Protective sleeve (1243); Hollow rod (1250); Channel (1251); Positioning sleeve (1252); Bottom frame assembly (1300); First connector (1310); First cavity (1311); Second connector (1320); Second cavity (1321); Third connecting assembly (1330); Third connecting rod (1331); Third connector (1340); Connection interface (1341); Connecting circular hole (1350); Pull rod (1400); Bending part (1410); Column (1450); Box body (1500); Pulley structure (1510); Connecting block (1520); Cross bar (1530); Tow handle (1540).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on." "coupled to." or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, in order to prevent the folding wagon from raising the frame or increasing the packaging size after folding, at the same time, the supporting strength at the bottom of the folding wagon is increased, the supporting gap is reduced greatly, and the stability is improved. The application of the present invention provides a folding frame 1000.

Referring to FIG. 1, a folding frame 1000 includes a first stand assembly 1100, a second stand assembly 1200 and a bottom frame assembly 1300.

Figure 2:
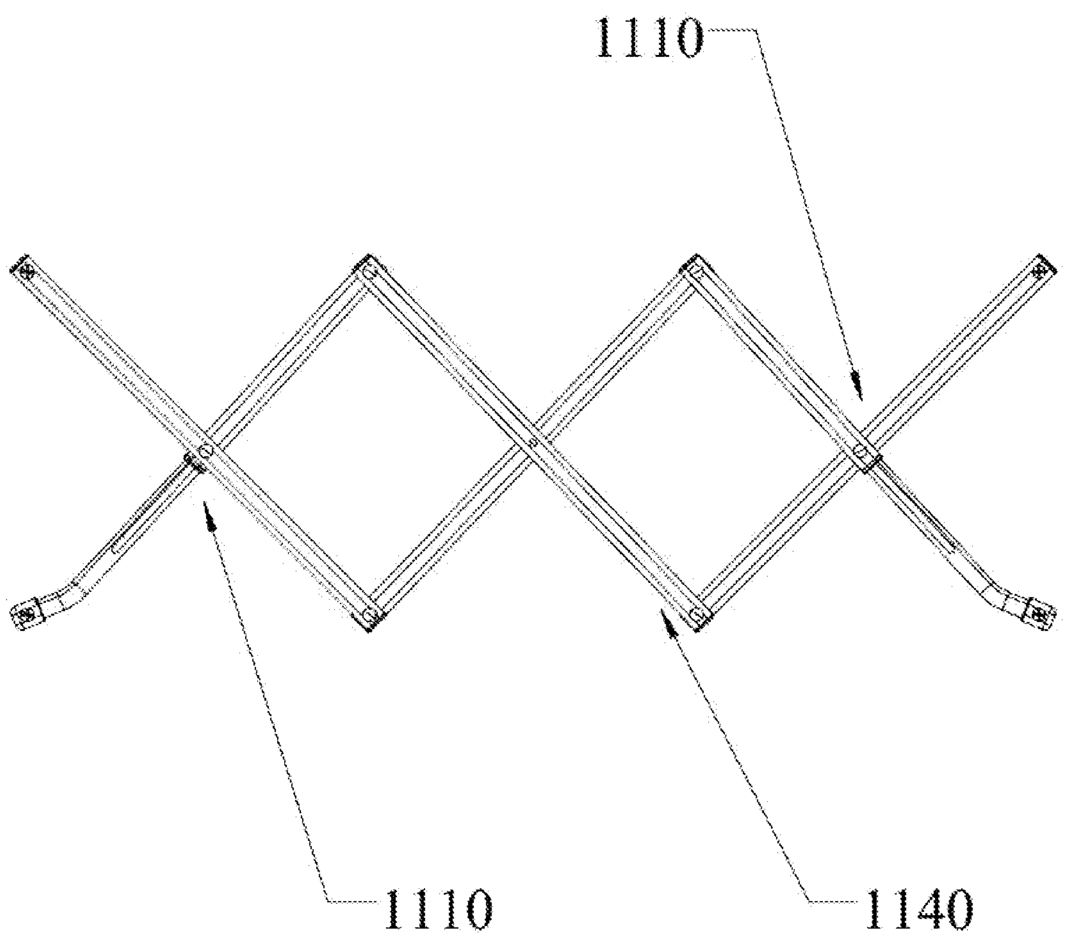
FIG. 2 is a schematic diagram of the first stand assembly in the application of the present invention.

Referring to FIGS. 1 and 2, the first stand assembly 1100 is provided as two groups. The first stand assembly 1100 is arranged along the length direction of the folding frame 1000. The first stand assembly 1100 includes two groups of first telescopic assemblies 1110 and a group of first connecting assemblies 1140, the first connecting assemblies 1140 are located between the two groups of first telescopic assemblies 1110 and are hinged with the first telescopic assemblies 1110.

Figure 3:
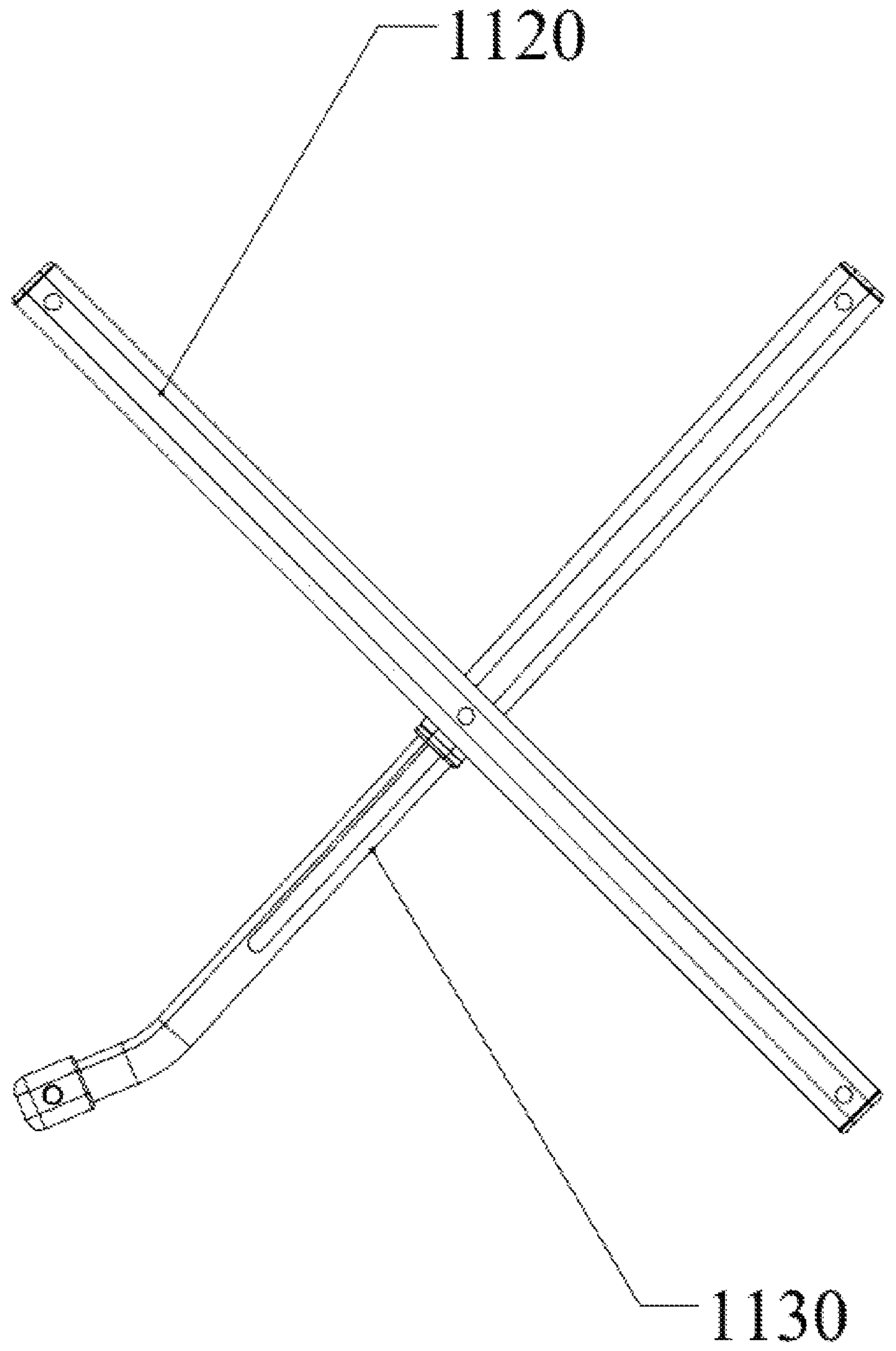
FIG. 3 is a schematic diagram of the first telescopic assembly in the application of the present invention.

Referring to FIG. 3, the first telescopic assembly 1110 includes a first connecting rod 1120 and a first telescopic rod 1130, which are distributed in a cross shape. There is a connecting circular hole 1350 at the joint of the first connecting rod 1120 and the first telescopic rod 1130. At the same time, both ends of the first connecting rod 1120 and the first telescopic rod 1130 are provided with connecting circular holes 1350, and the first connecting rod 1120 and the first telescopic rod 1130 are rotatably connected.

Figure 4:
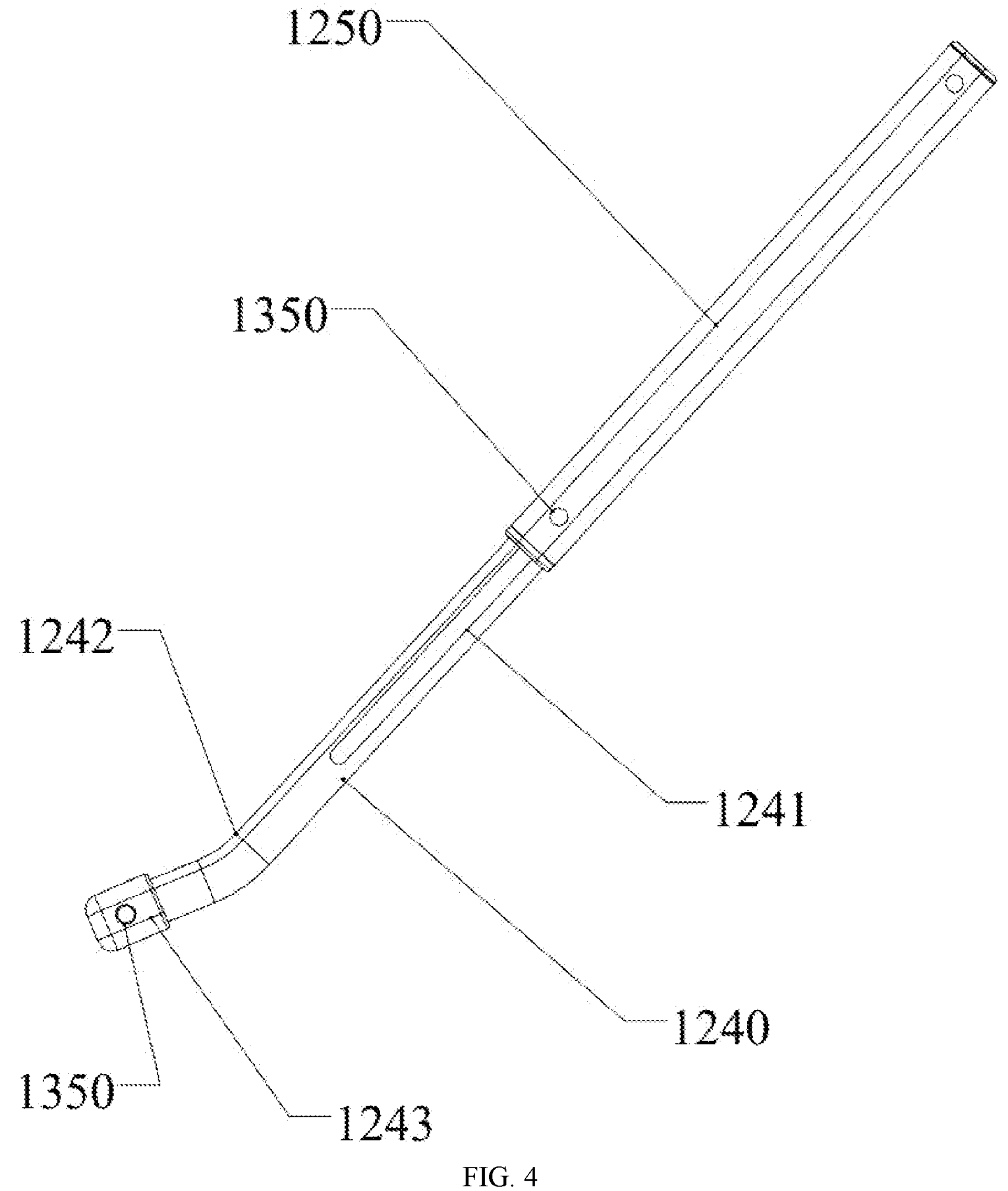
FIG. 4 is a schematic diagram of the first telescopic rod in the application of the present invention.

Further, as shown in FIG. 4, the first telescopic rod 1130 is provided with a sliding rod 1240 and a hollow rod 1250, and the sliding rod 1240 is provided with a sliding groove 1241, which extends along the length direction of the sliding rod 1240 and runs through the sliding rod 1240, and the sliding groove 1241 has the same size as the connecting circular hole 1350.

Further, one end of the moving rod 1240 is an arc-shaped structure 1242, and compared with the other end, the end with the arc-shaped structure 1242 is an end far away from the sliding groove 1241, and a protective sleeve 1243 is sleeved on the arc-shaped structure 1242, and the protective sleeve 1243 is provided with a connecting circular hole 1350.

Figure 5:
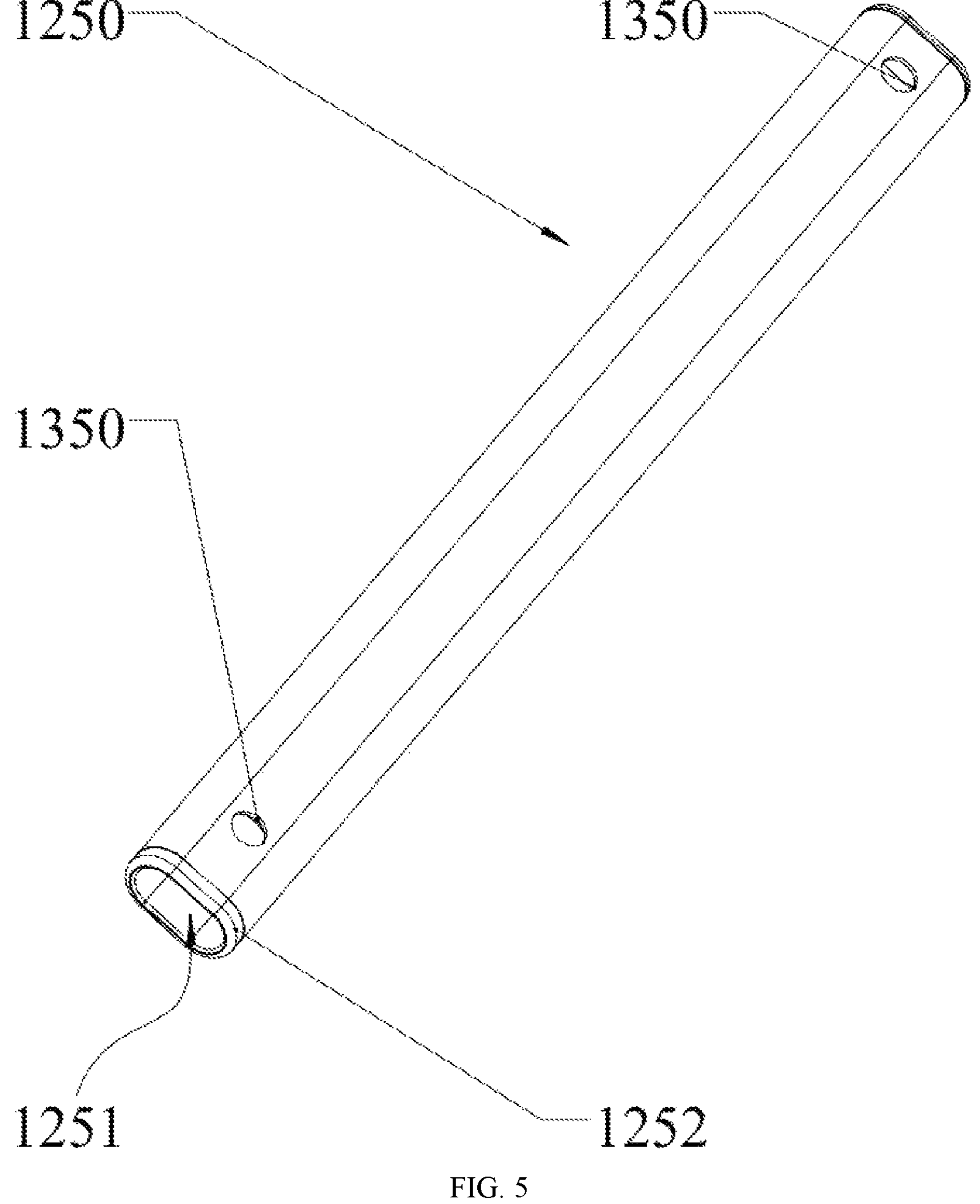
FIG. 5 is a schematic diagram of a hollow rod in the application of the present invention.

As shown in FIG. 5, the hollow rod 1250 has a channel 1251 extending along the length direction of the hollow rod 1250, and the sliding rod 1240 movably passes through the channel 1251, and one end of the channel 1251 is nested with a positioning sleeve 1252.

Further, as shown in FIGS. 3 to 5, the positioning sleeve 1252 is connected with the sliding rod 1240, and the sliding rod 1240 slidably passes through the positioning sleeve 1252. The positioning sleeve 1252 is symmetrically provided with connecting circular holes 1350, and the connecting circular holes 1350 pass through the positioning sleeve 1252.

Figure 6:
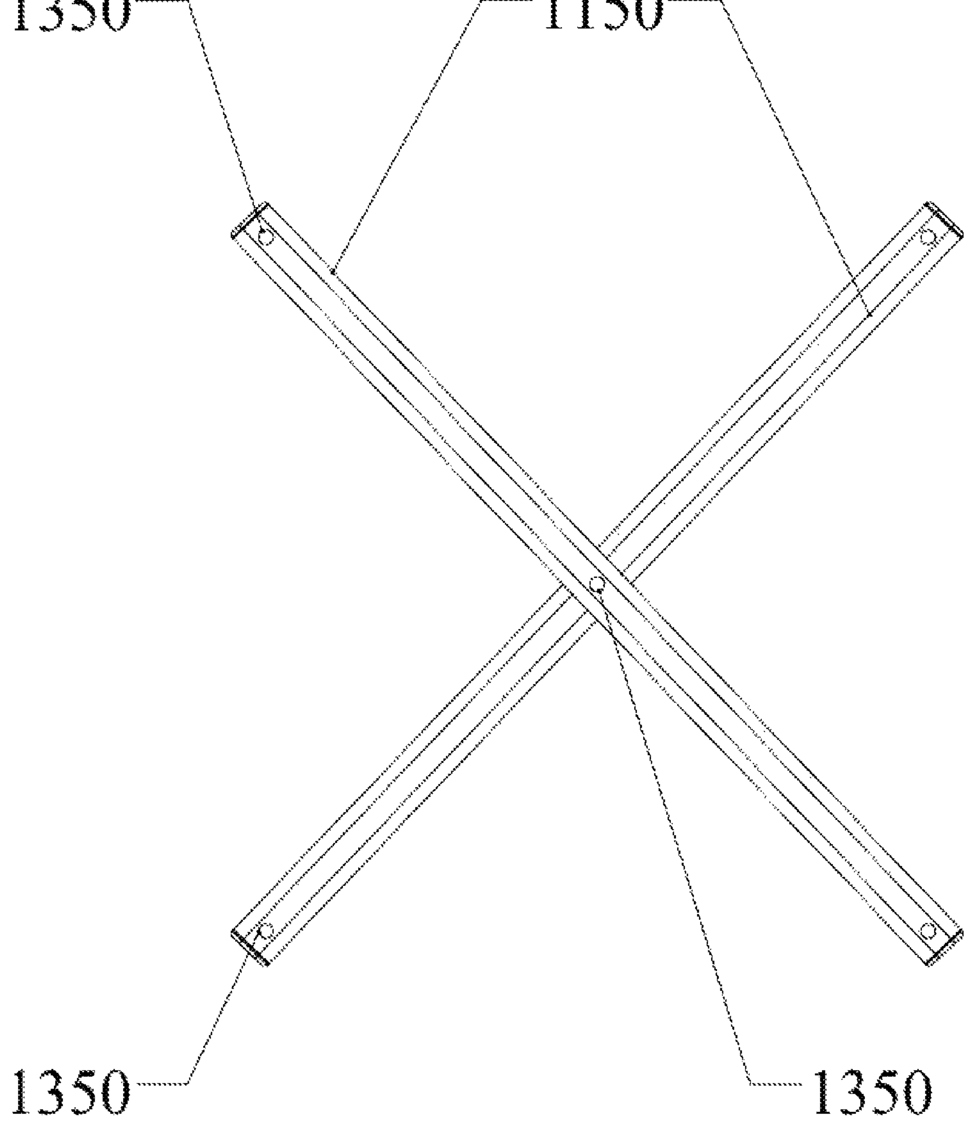
FIG. 6 is a schematic diagram of the first connecting assembly in the application of the present invention.

Referring to FIG. 6, the first connecting assembly 1140 is composed of two first connecting rockers 1150, and both ends of the two first connecting rockers 1150 are also provided with connecting circular holes 1350. The two first connecting rockers 1150 are distributed in a cross shape, and the joint of the two first connecting rockers 1150 is also provided with connecting circular holes 1350, and the two first connecting rockers 1150 are hinged. Through two first connecting rockers 1150, the first connecting assembly 1140 can be rotatably connected to two groups of first telescopic assemblies 1110.

Figure 7:
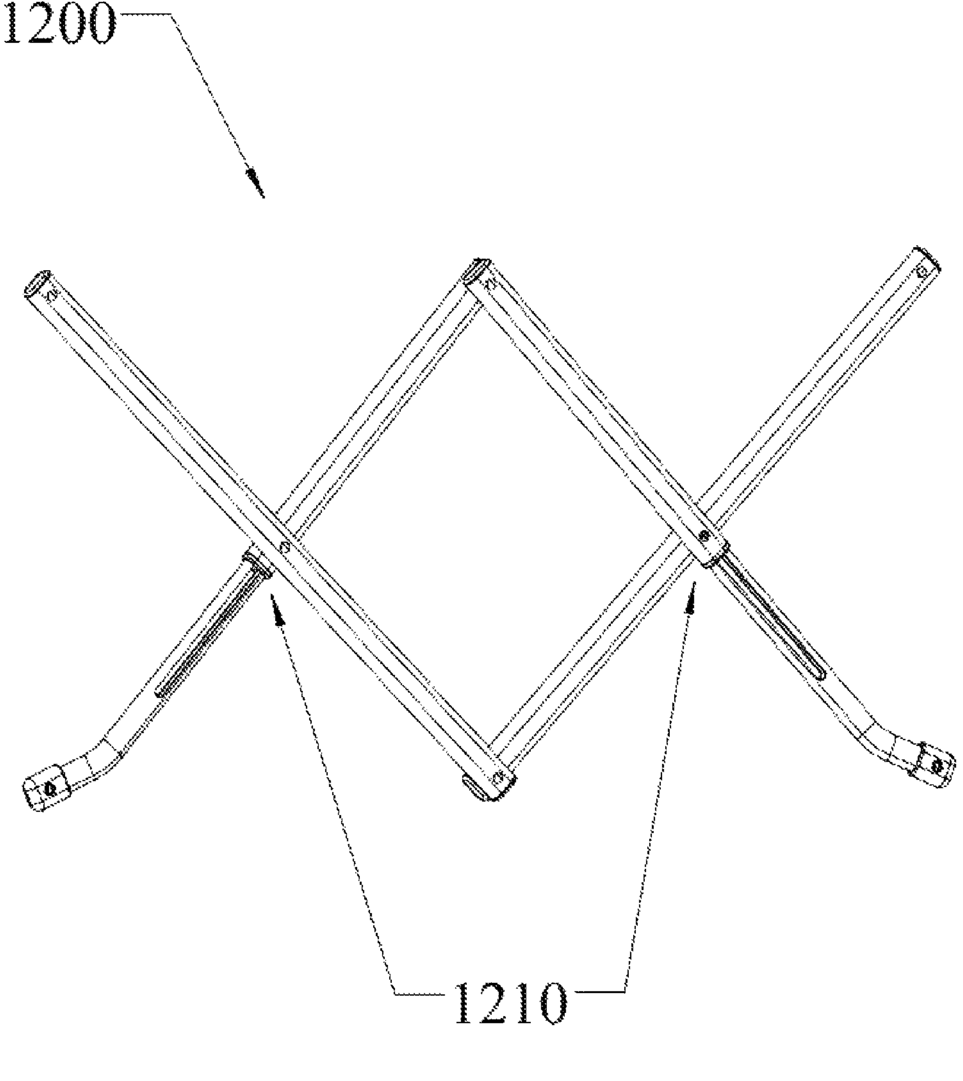
FIG. 7 is a schematic diagram of the second stand assembly in the application of the present invention.

Referring to FIGS. 1 and 7, the second stand assembly 1200 is provided as two groups, and the second stand assembly 1200 is arranged along the width direction of the folding frame 1000. The second stand assembly 1200 includes two groups of second telescopic assemblies 1210.

Figure 8:
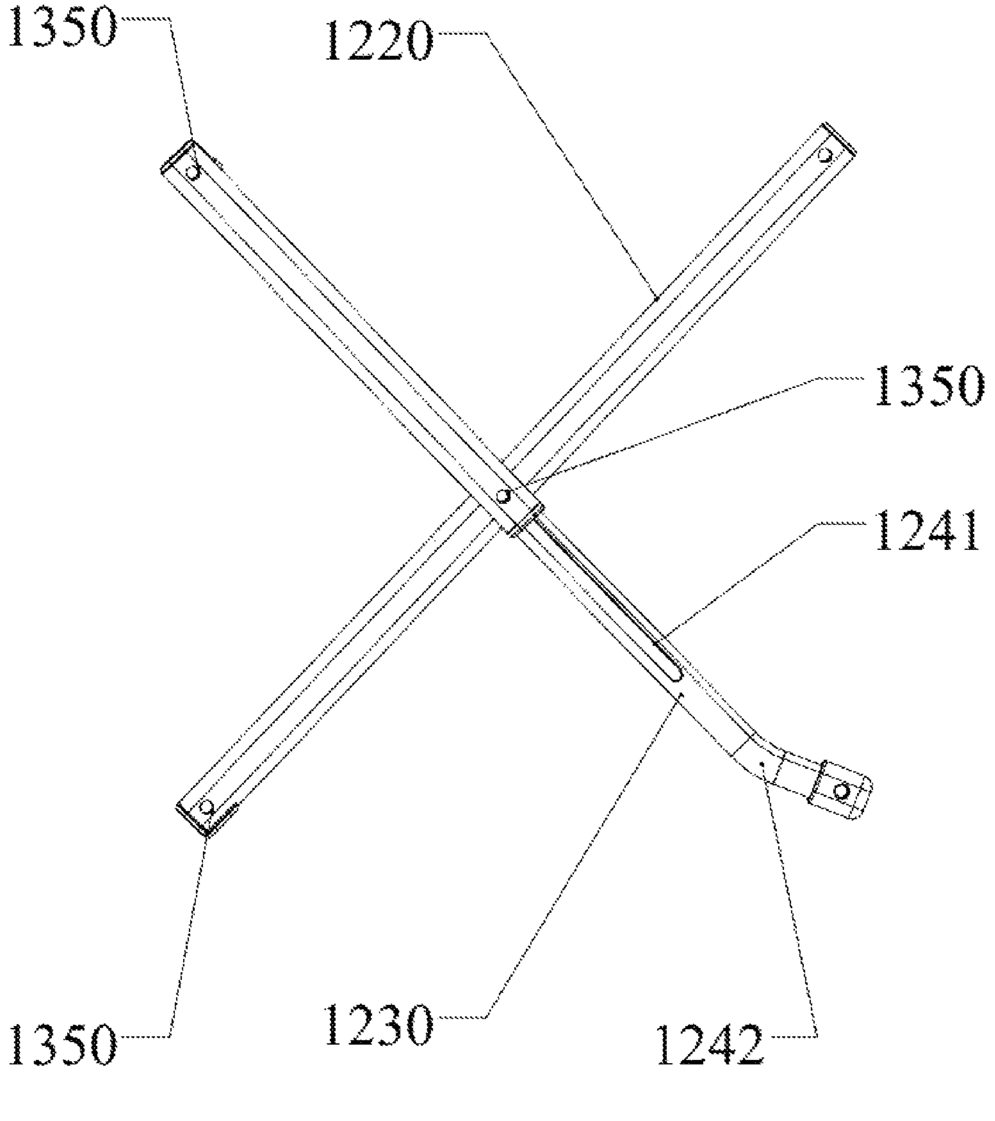
FIG. 8 is a schematic diagram of the second telescopic assembly in the application of the present invention.

Referring to FIG. 8, any one of the two groups of second telescopic assemblies 1210 includes a second connecting rod 1220 and a second telescopic rod 1230, which are distributed in a cross shape, and a connecting circular hole 1350 is arranged at the joint of the second connecting rod 1220 and the second telescopic rod 1230, and the connection relationship between them is hinged.

Further, the two ends of the second connecting rod 1220 and the second telescopic rod 1230 are also provided with connecting circular holes 1350, and the two groups of second telescopic assemblies 1210 are rotatably connected through the connecting circular holes 1350 and have two hinge points to form a detachable connection through threads.

Referring to FIGS. 4 and 5, the second telescopic rod 1230 and the first telescopic rod 1130 have the same structural composition, and both of them are composed of a sliding rod 1240 and a hollow rod 1250.

Figure 9:
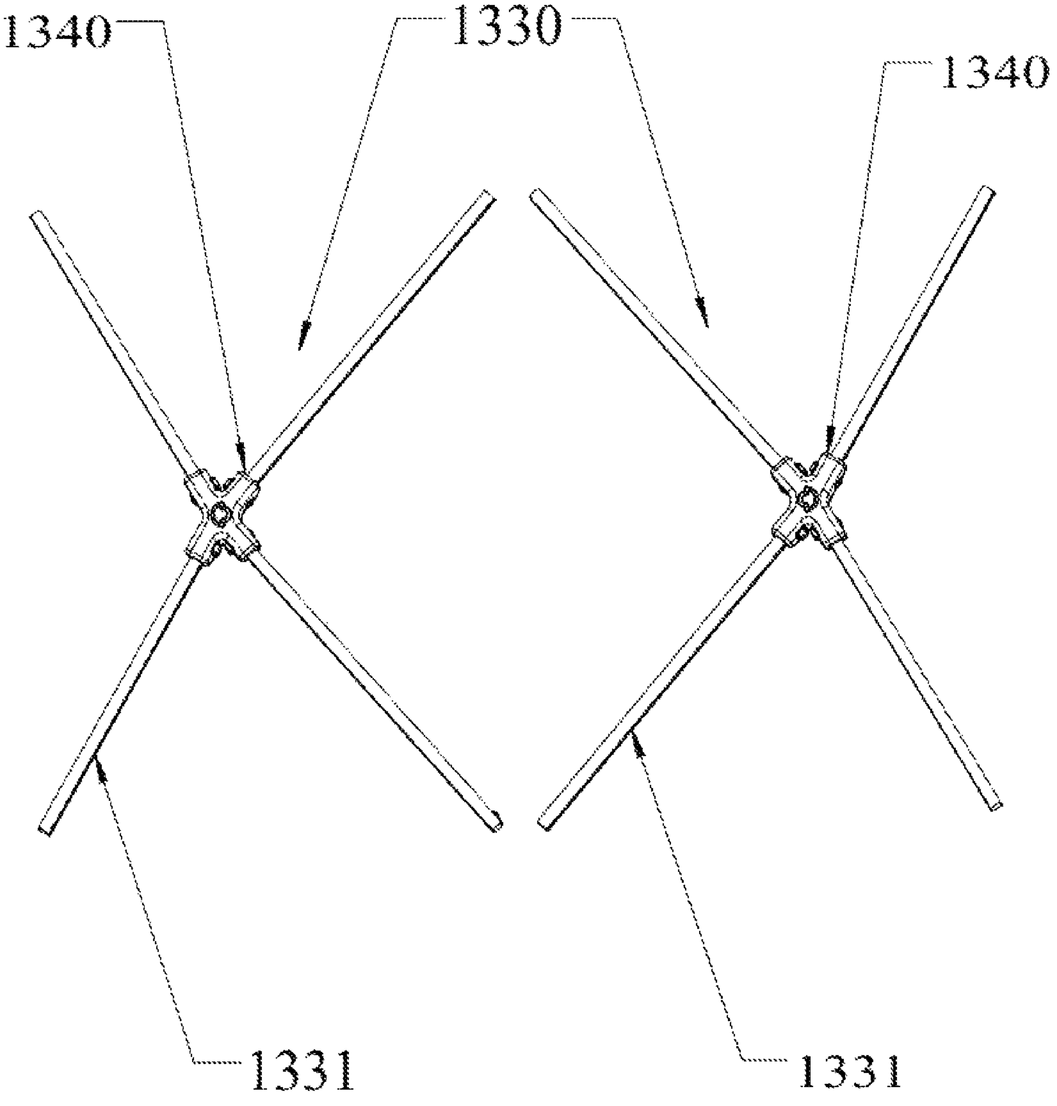
FIG. 9 is a schematic diagram of the bottom frame assembly in the application of the present invention.

Referring to FIG. 9, the bottom frame assembly 1300 includes two groups of third connecting assemblies 1330, each group of third connecting assemblies 1330 is composed of at least four third connecting rods 1331 and one third connector 1340, and at least four third connecting rods 1331 are distributed in an "X" shape.

Figure 10:
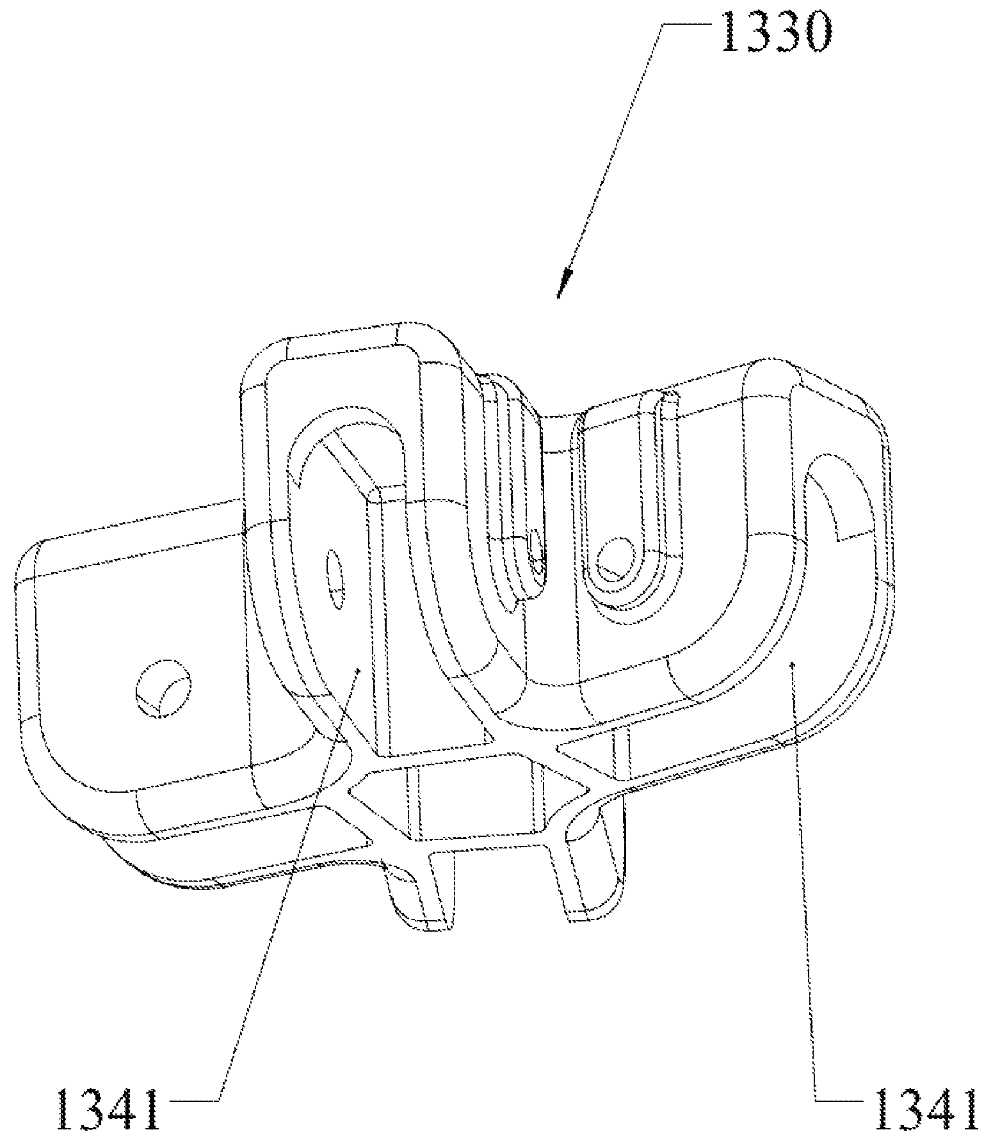
FIG. 10 is a schematic diagram of a third connector in the application of the present invention.

Referring to FIG. 10, the third connector 1340 has four connection interfaces 1341, and the third connecting rod 1331 is inserted into the connection interfaces 1341, and is connected and fixed with the third connector 1340 through threads.

Figure 11:
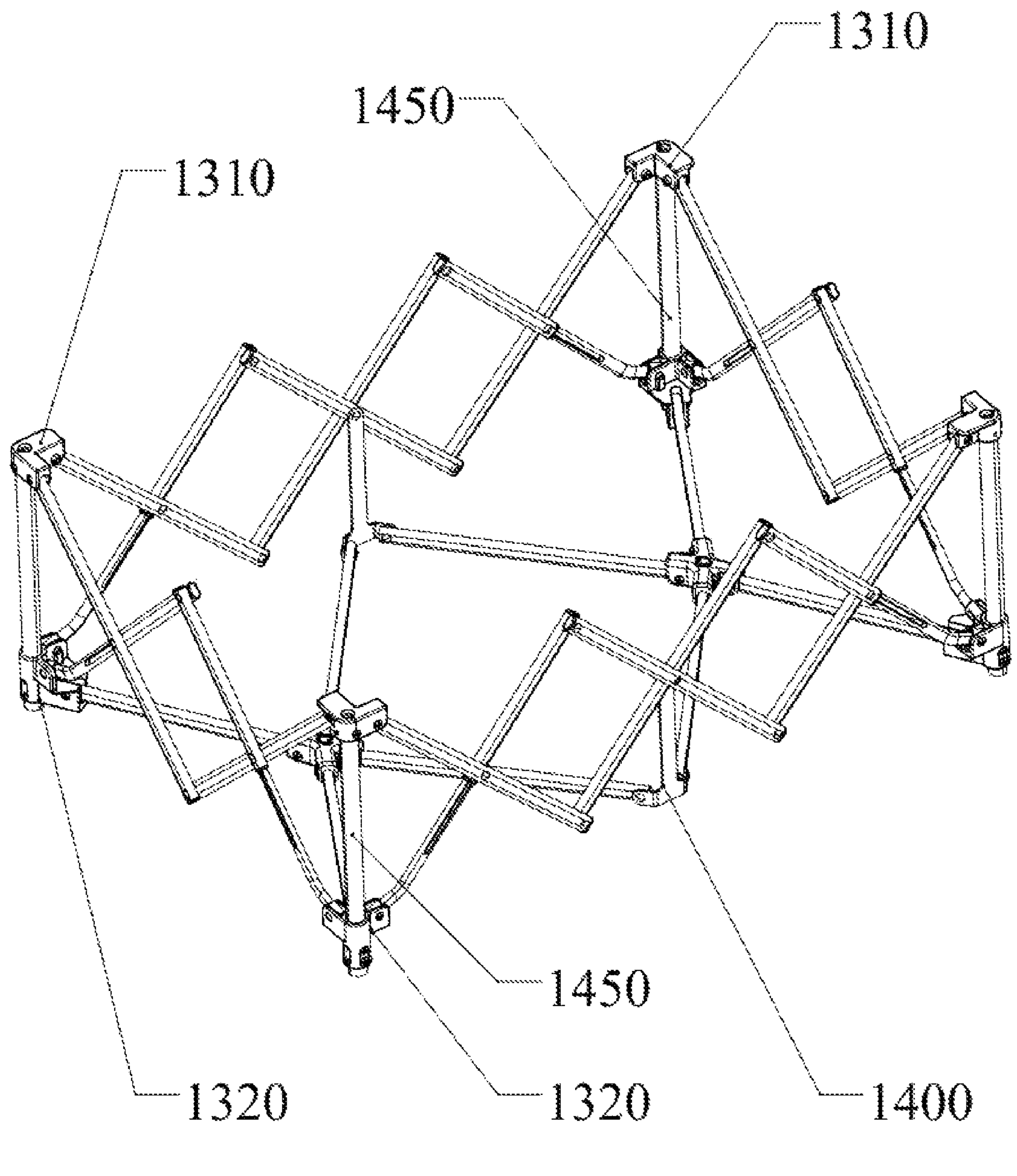
FIG. 11 is a schematic diagram of the folding frame in the application of the present invention.

Referring to FIG. 11, two groups of first and second stand assemblies 1100 and 1200 are provided. The first and second stand assemblies 1100 and 1200 are alternately arranged, and the folding frame 1000 has a rectangular structure in the unfolded state.

Further, the joints of the first stand assembly 1100 and the second stand assembly 1200 are respectively provided with a first connector 1310 and a second connector 1320. The number of the first connectors 1310 is four, which are arranged above the folding frame 1000. The first telescopic assembly 1110 and the second telescopic assembly 1210 are fixed on the first connector 1310 through threaded connection and hinged with the first connector 1310.

Figure 12:
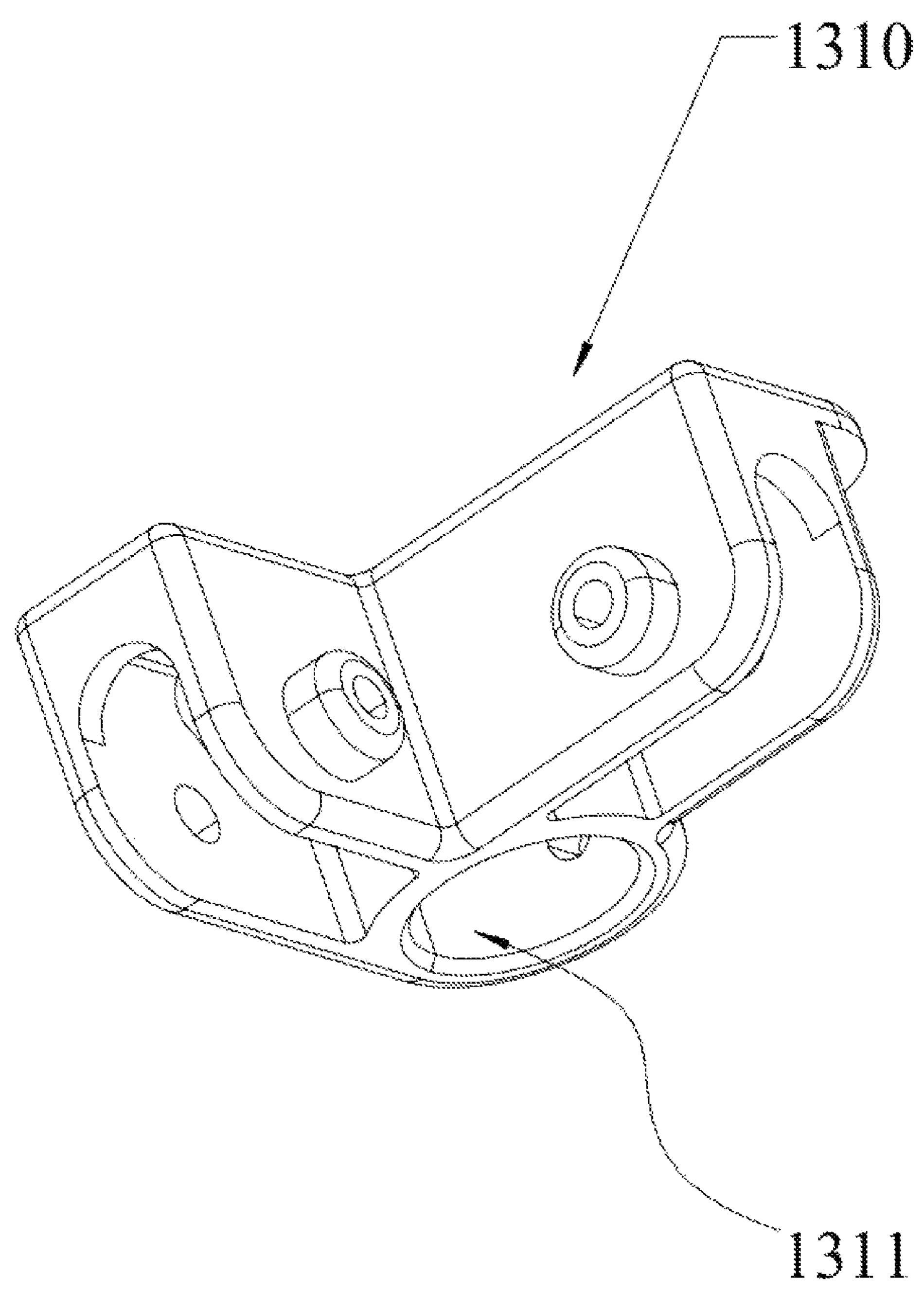
FIG. 12 is a schematic diagram of the first connector in the application of the present invention.

Further, as shown in FIG. 11 and FIG. 12, the first connector 1310 has a first cavity 1311, which is hollow. A column 1450 is inserted into the first cavity 1311, and the column 1450 passes through the first cavity 1311 and is connected to the second connector 1320.

Figure 13:
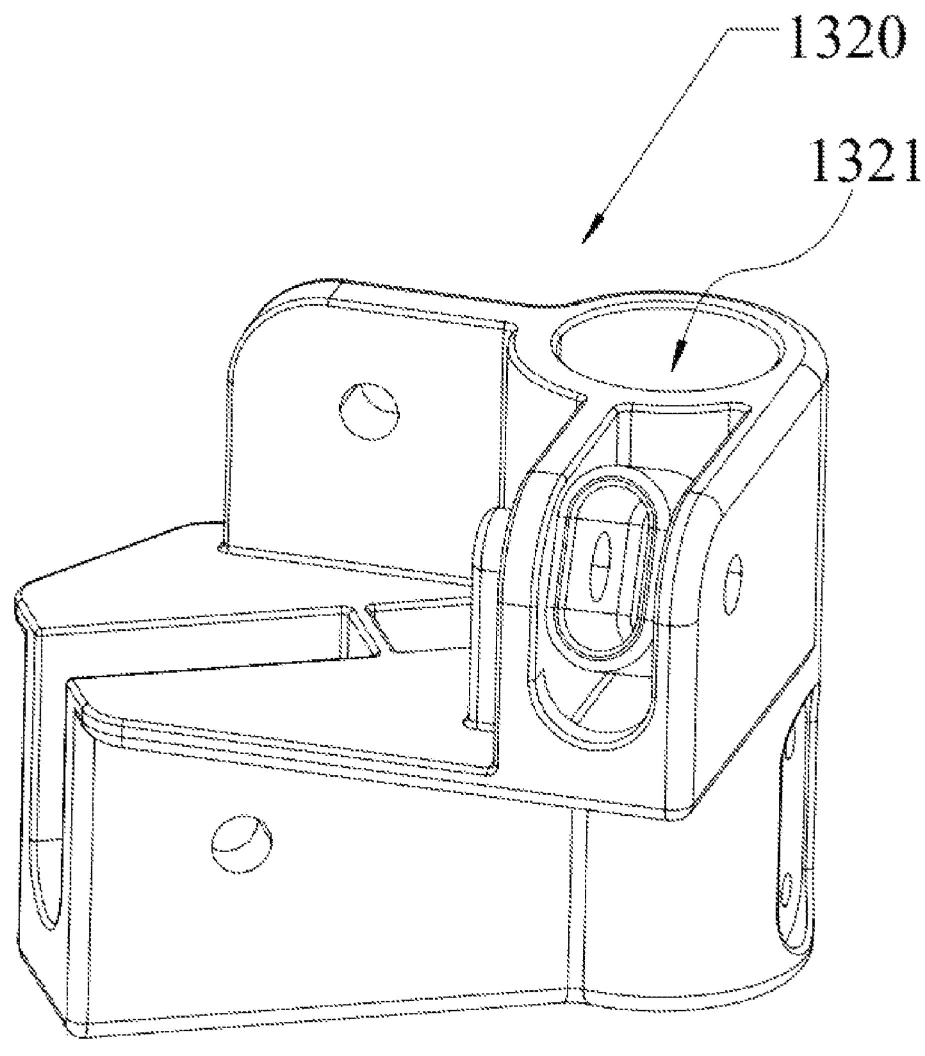
FIG. 13 is a schematic diagram of the second connector in the application of the present invention.

Referring to FIG. 11 and FIG. 13, there are four second connectors 1320, which are arranged under the folding frame 1000. The second connectors 1320 have a second cavity 1321, which is hollow, and a column 1450 is inserted into the second cavity 1321.

The second connector 1320 connects and fixes various assemblies of the folding frame 1000, wherein the sliding rod 1240 is hinged on the second connector 1320 through threads, Referring to FIGS. 9 to 13, the bottom frame assembly 1300 is detachably connected to the first stand assembly 1100 and the second stand assembly 1200 through a second connector 1320. The bottom frame assembly 1300 is detachably connected with the first stand assembly 1100 through at least two pull rods 1400. The bottom end of the bottom frame assembly 1300 is respectively hinged with one of the third connecting rods 1331 in the two groups of third connecting assemblies 1330, and the top end of the pull rod 1400 is hinged with the first connecting assembly 1140.

Figure 14:
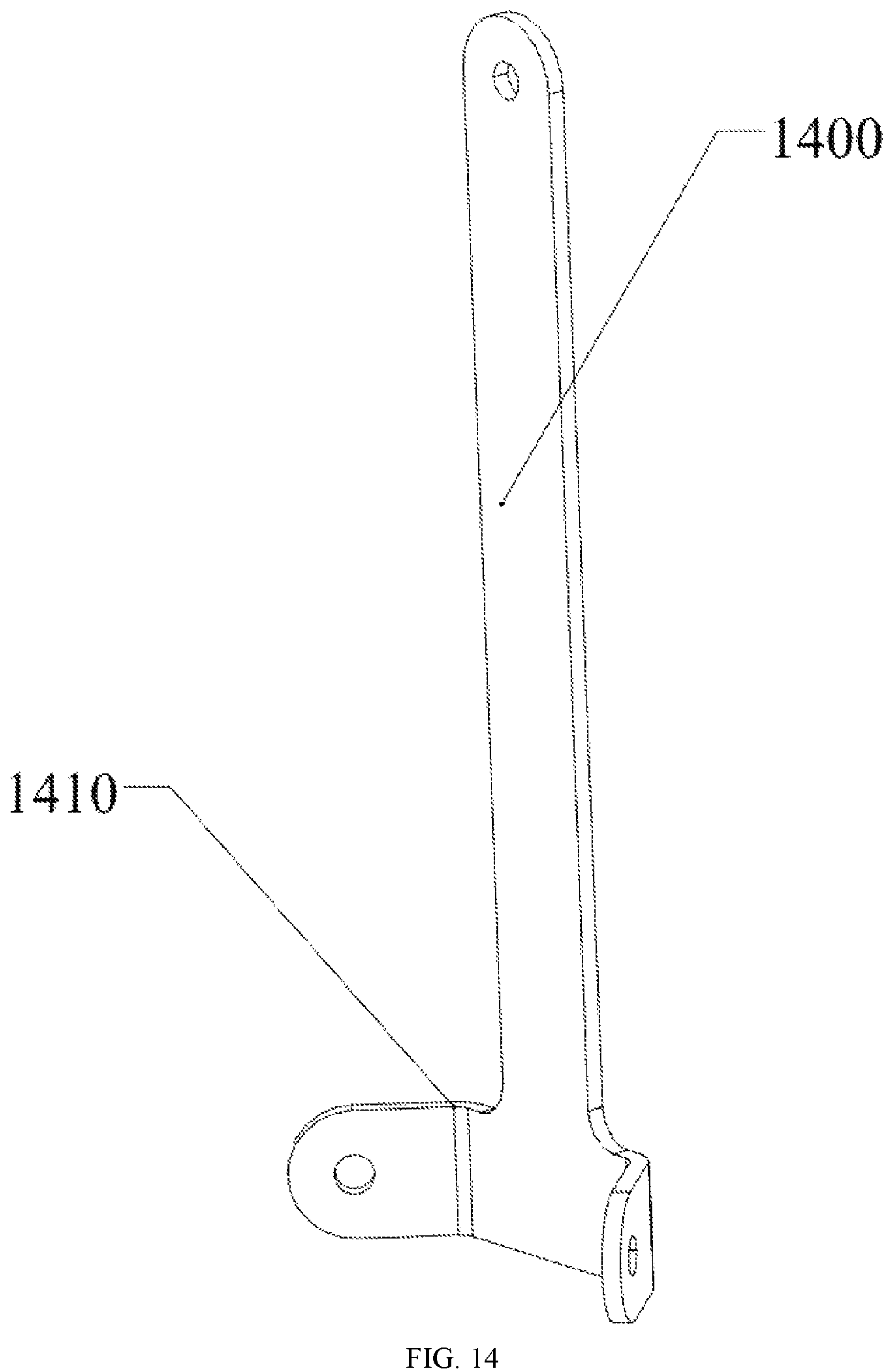
FIG. 14 is a schematic diagram of a pull rod in the application of the present invention.

Further, as shown in FIG. 14, the bottom frame assembly 1300 is connected and fixed to the second connector 1320 through the third connecting rod 1331. The first connecting rocker 1150 and the third connecting rod 1331 are detachably connected through the pull rod 1400, which is an inverted T-shaped non-telescopic structure and made of rigid material, and the bottom of the pull rod 1400 has two bending parts 1410.

Figure 15:
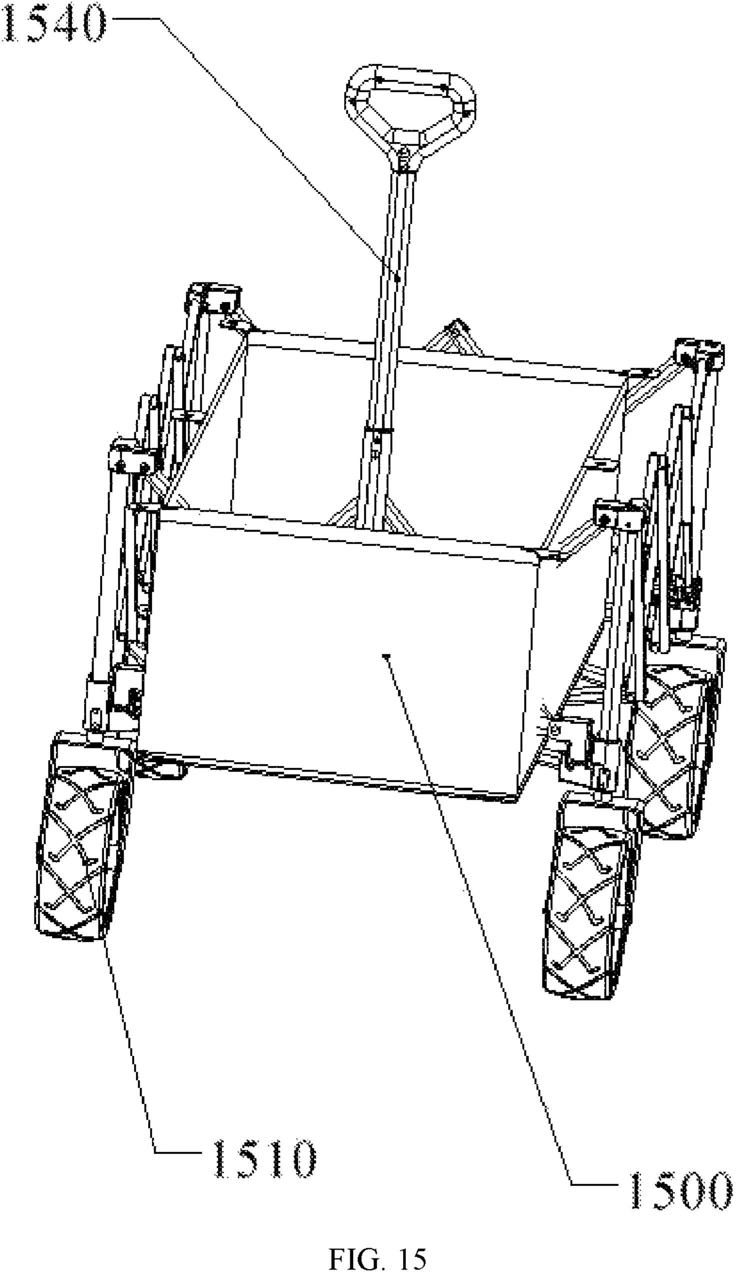
FIG. 15 is a schematic diagram of the folding wagon in the application of the present invention.

As a preferred embodiment of the application of the present invention, referring to FIG. 15, the application of the present invention also provides a folding wagon, which includes a folding frame 1000 and a box body 1500.

Figure 16:
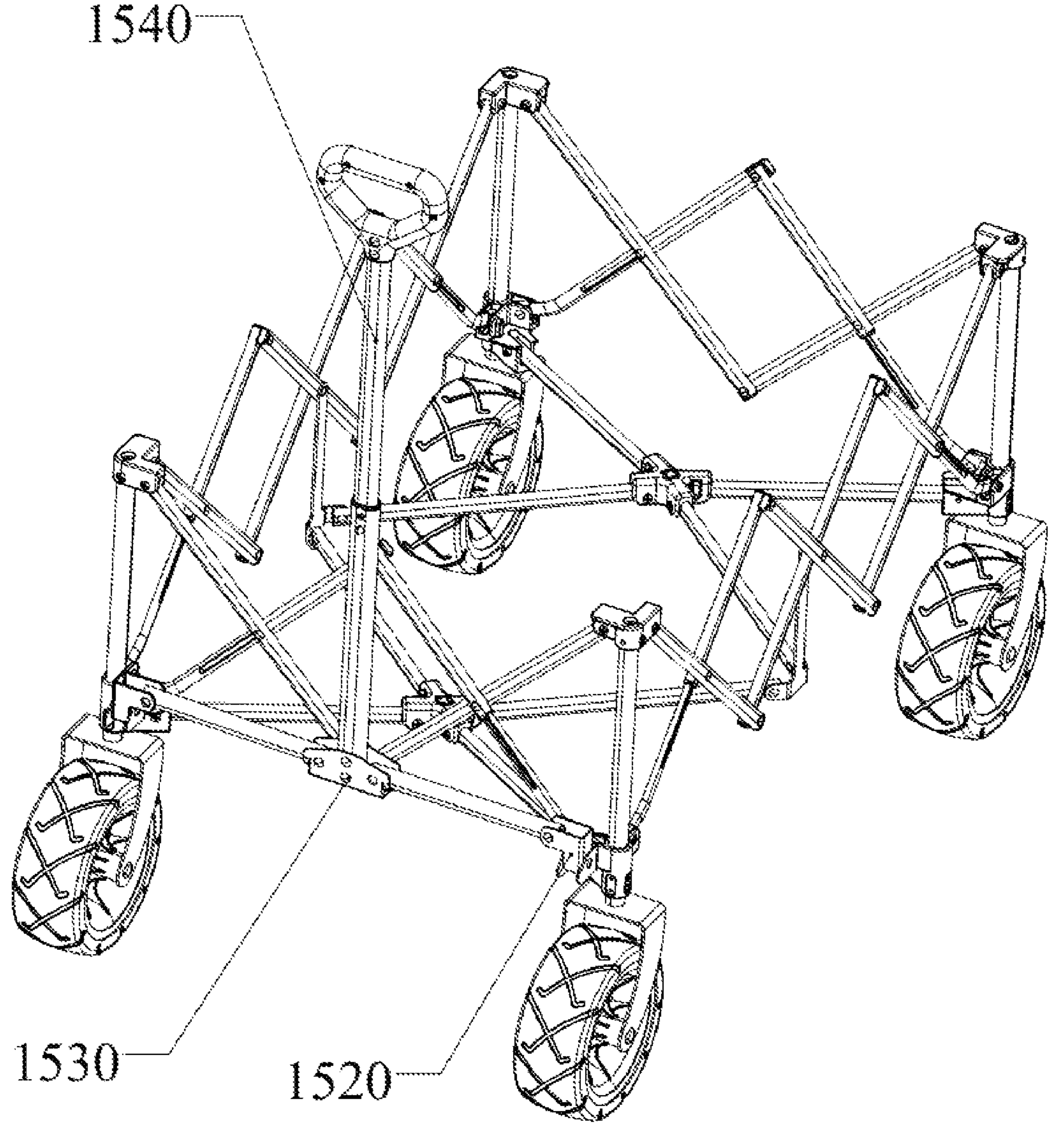
FIG. 16 is a schematic diagram of the folding frame in the application of the present invention.

Referring to FIG. 16, a pulley structure 1510 is connected and fixed below the column 1450, and the pulley structure 1510 is located below the folding frame 1000.

Further, in the width direction of the folding frame 1000, two adjacent second connectors 1320 are provided with connecting blocks 1520, and a cross bar 1530 is fixed between the connecting blocks 1520, and the cross bar 1530 is fixed on the second connectors 1320 through threaded connection.

Further, the cross bar 1530 is fixed with a tow handle 1540 through threaded connection, and the tow handle 1540 has a telescopic structure, and can move in the vertical direction through a spring buckle.

In the application of the present invention, the folding frame 1000 and the parts in the folding wagon are fixed by threaded connection. Threaded connection can not only realize detachable connection, facilitate maintenance and replacement of parts, improve service life and efficiency and adapt to parts with different shapes and sizes, but also have strong versatility and flexibility. It can also disperse the stress at the connection part, reduce the risk of stress concentration and fatigue crack, save the cost of materials and technology, and reduce the connection weight and noise. In other embodiments (not shown in the figure), the connection mode can also use snap connection, magnetic connection, pin connection and other ways, as long as the display bracket can be connected and fixed.

As a preferred embodiment of the application of the present invention, the application of the present invention further provides a using method of the folding wagon.

Referring to FIGS. 1 to 16, when the folding wagon is used, first, the first stand assembly and the second stand assembly are unfolded. The two assemblies are respectively arranged along the length direction and the width direction of the folding frame. Then, the bottom frame assembly is fixed below the first and second stand assemblies. The bottom frame assembly is detachably connected to the first stand assembly and the second stand assembly through a second connector. Next, the box body is placed above the bottom frame assembly. The box body is a rectangular structure and can be detachably fixed inside the folding frame.

When the folding wagon needs to be stored after use, firstly, the box body is removed and stored separately. Then, the bottom frame assembly needs to be disassembled. Next, the first stand assembly and the second stand assembly are gathered. Because the first connector and the second connector are respectively arranged at the joints of the first stand assembly and the second stand assembly, the first stand and the second stand assemblies can be gathered into a whole, and because of the telescopic assembly, gathering the first stand and the second stand will not increase the overall height of the folding frame. Finally, the first stand assembly and the second stand assembly are accommodated together, and the bottom frame assembly is accommodated separately.

To sum up, the folding wagon of the present invention has the following advantages: foldability, which may make storage and transportation more convenient, especially in the case of limited space, and at the same time, the space occupied by the wagon will not be increased in the folded state; stability, the double-layer telescopic assembly structure of the first stand assembly and the second stand assembly provides good stability; durability, the two groups of connecting assemblies of the bottom frame assembly increase the bottom support strength and durability of the folding wagon, reduce the support gap of the bottom frame and improve the stability; at the same time, the folding wagon is easy to maintain and repair, which may make the maintenance and repair work easier because all assemblies can be disassembled.

At the broad level of the present application, the folding wagon of the present application has many possible application fields. For example: logistics and transportation: folding wagons can be used to transport goods, especially in the environment where goods need to be moved or stored frequently, such as warehouses, supermarkets and airports; or for family and individual use: the folding wagon can be used for family or individual daily life, such as shopping, moving, gardening, etc.; it may also be used in an office environment, in which the folding wagon can be used to transport documents, equipment or other office supplies; or medical facilities: in hospitals or other medical facilities, folding wagons can be used to transport medical equipment, drugs or patients, or industrial environment; the folding wagon can be used to transport heavy or large equipment and materials.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A folding frame, wherein said folding frame comprises a first stand assembly, a second stand assembly and a bottom frame assembly; and wherein, said first stand assembly is arranged along a length direction of said folding frame, and comprises two groups of first telescopic assemblies and a group of first connecting assembly, wherein any one of said two groups of first telescopic assemblies comprises a first connecting rod and a first telescopic rod, and said first connecting rod and said first telescopic rod are distributed in a cross shape; and said first connecting assembly consists of two first connecting rockers; and wherein, said second stand assembly is arranged along a width direction of said folding frame, and comprises two groups of second telescopic assemblies, wherein any one of said two groups of second telescopic assemblies comprises a second connecting rod and a second telescopic rod, and said second connecting rod and said second telescopic rod are distributed in a cross shape; and wherein, said bottom frame assembly comprises two groups of third connecting assemblies, each group of third connecting assemblies consists of at least four third connecting rods and a third connector, and at least four of said third connecting rods are distributed in an X shape as a whole; and wherein, a first connector and a second connector are respectively arranged at joints of said first stand assembly and said second stand assembly; and said bottom frame assembly is detachably connected to said first stand assembly and said second stand assembly through said second connector; and said bottom frame assembly is detachably connected with said first stand assembly through at least two pull rods, and bottom ends of said pull rods are respectively hinged with one of said third connecting rods in said two groups of third connecting assemblies; and top ends of said pull rods are respectively hinged with said first connecting assembly.

2. The folding frame according to claim 1, wherein said first stand assembly and said second stand assembly are both provided in two groups, said first stand assembly and said second stand assembly are alternately arranged, and said folding frame has a rectangular structure in an unfolded state.

3. The folding frame according to claim 2, wherein said first telescopic rod, said first connecting rod and said first connecting rockers are all provided with connecting circular holes, and said first connecting assembly is hinged with said two groups of first telescopic assemblies through said connecting circular holes, and said two first connecting rockers are distributed in a cross shape.

4. The folding frame according to claim 3, wherein said second connecting rod and said second telescopic rod are both provided with said connecting circular holes and said two groups of second telescopic assemblies are rotatably connected through said connecting circular holes with two hinge points and form a detachable connection through threads.

5. The folding frame according to claim 4, wherein said first telescopic rod and said second telescopic rod are both composed of a sliding rod and a hollow rod, and each sliding rod is provided with a sliding groove, wherein said sliding groove extends along a length direction of said sliding rod and penetrates through said sliding rod and said sliding groove is equal in size to said connecting circular hole.

6. The folding frame according to claim 5, wherein one end of said sliding rod has an arc-shaped structure and said arc-shaped structure is an end far away from said sliding groove; and a protective sleeve is sleeved on said arc-shaped structure and said connecting circular holes are arranged on said protective sleeve.

7. The folding frame according to claim 6, wherein a channel extending along a length direction of said hollow rod is arranged inside said hollow rod, said sliding rod movably passes though said channel, and a positioning sleeve is nested at one end of said channel.

8. The folding frame according to claim 7, wherein said positioning sleeve is connected with said sliding rod and said sliding rod slidably passes though the positioning sleeve and said connecting circular holes are symmetrically arranged on said positioning sleeve and run through said positioning sleeve.

9. The folding frame according to claim 8, wherein said third connector has four connection interfaces, and said third connecting rods is inserted into said connection interfaces to form connection and fixation with said third connector through threads.

10. The folding frame according to claim 9, wherein a number of said first connector is four, which are arranged above said folding frame, and said first telescopic assemblies and said second telescopic assemblies are fixed on said first connector through a threaded connection and hinged with said first connector.

11. The folding frame according to claim 10, wherein said first connector has a first cavity with a hollow structure, and a column is inserted into said first cavity, and said columns run through said first cavity and are connected to said second connector.

12. The folding frame according to claim 11, wherein a number of said second connectors is four, which are arranged below said folding frame, and said second connector have a second cavity with a hollow structure, and said column are inserted into said second cavity.

13. The folding frame according to claim 12, wherein said second connector is connects and fixes on each assembly of said folding frame, wherein said sliding rod is hinged on said second connector through threads and said bottom frame assembly is connected and fixed on said second connector through said third connecting rod.

14. The folding frame according to claim 13, wherein said first connecting rocker and said third connecting rod are detachably connected through said pull rods, which is an inverted T-shaped non-telescopic structure and made of a rigid material, and a bottom of said pull rods has two bending parts.

15. A folding wagon, wherein said folding wagon comprises a folding frame and a box body; and said folding frame comprises a first stand assembly, a second stand assembly and a bottom frame assembly; and said first stand assembly is arranged along a length direction of said folding frame, and comprises two groups of first telescopic assemblies and a group of first connecting assembly, wherein any one of said two groups of first telescopic assemblies comprises a first connecting rod and a first telescopic rod, and said first connecting rod and said first telescopic rod are distributed in a cross shape; and said first connecting assembly consists of two first connecting rockers; and wherein, said second stand assembly is arranged along a width direction of said folding frame, and comprises two groups of second telescopic assemblies, wherein any one of said two groups of second telescopic assemblies comprises a second connecting rod and a second telescopic rod, and said second connecting rod and said second telescopic rod are distributed in a cross shape; and wherein, said bottom frame assembly comprises two groups of third connecting assemblies, each group of third connecting assemblies consists of at least four third connecting rods and a third connector, and at least four of said third connecting rods are distributed in an X shape as a whole; and wherein, a first connector and a second connector are respectively arranged at joints of said first stand assembly and said second stand assembly; and said bottom frame assembly is detachably connected to said first stand assembly and said second stand assembly through said second connector; and said bottom frame assembly is detachably connected with said first stand assembly through at least two pull rods, and bottom ends of said pull rods are respectively hinged with one of said third connecting rods in said two groups of third connecting assemblies; and top ends of said pull rods are respectively hinged with said first connecting assembly; and said box body has a rectangular structure and is detachably fixed inside said folding frame.

16. The folding wagon according to claim 15, wherein a number of said second connector is four, and four said second connector are all inserted with columns, and pulley structures are connected and fixed below said columns and said pulley structures are located below said folding frame.

17. The folding wagon according to claim 16, wherein two said second connectors located in a width direction of said folding frame are provided with connecting blocks, and a cross bar is fixed between said connecting blocks, and said cross bar is fixed on said second connectors through a threaded connection.

18. The folding wagon according to claim 17, wherein said cross bar is fixed with a tow handle through a threaded connection, and said tow handle is of a telescopic structure, and can move in a vertical direction through a spring buckle.

19. A method for carrying goods, comprising providing a folding wagon, wherein said folding wagon comprises a folding frame and a box body; and said folding frame comprises a first stand assembly, a second stand assembly and a bottom frame assembly; and said first stand assembly is arranged along a length direction of said folding frame, and comprises two groups of first telescopic assemblies and a group of first connecting assemblies, wherein any one of said two groups of first telescopic assemblies comprises a first connecting rod and a first telescopic rod, and said first connecting rod and said first telescopic rod are distributed in a cross shape; and said first connecting assembly consists of two first connecting rockers; and wherein, said second stand assembly is arranged along a width direction of said folding frame, and comprises two groups of second telescopic assemblies, wherein any one of said two groups of second telescopic assemblies comprises a second connecting rod and a second telescopic rod, and said second connecting rod and said second telescopic rod are distributed in a cross shape; and wherein, said bottom frame assembly comprises two groups of third connecting assemblies, each group of third connecting assemblies consists of at least four third connecting rods and a third connector, and at least four of said third connecting rods are distributed in an X shape as a whole; and wherein, a first connector and a second connector are respectively arranged at joints of said first stand assembly and said second stand assembly; and said bottom frame assembly is detachably connected to said first stand assembly and said second stand assembly through said second connector; and said bottom frame assembly is detachably connected with said first stand assembly through at least two pull rods, and bottom ends of said pull rods are respectively hinged with one of said third connecting rods in said two groups of third connecting assemblies; and top ends of said pull rods are respectively hinged with said first connecting assembly; and said box body has a rectangular structure and is detachably fixed inside said folding frame; and the method comprises:

when in use, unfolding said first stand assembly and said second stand assembly; and fixing said bottom frame assembly under said first stand assembly and said second stand assembly; and placing said box body above said bottom frame assembly; and when in storage, taking down said box body; and gathering said folding frame for storage.

20. The method according to claim 19, wherein before storing said folding wagon, it is necessary to disassemble said bottom frame assembly, gather said first stand assembly and said second stand assembly, and store them separately from said bottom frame assembly.

* * * * *